3,040,516
DETONATIVE COMBUSTION METHOD AND MEANS FOR RAM-JET ENGINE

Dale W. Brees, Wichita, Kans., assignor to Boeing Airplane Company, Wichita, Kans., a corporation of Delaware
Filed Aug. 3, 1959, Ser. No. 831,153
4 Claims. (Cl. 60—35.3)

My invention relates to a method and means for supersonic ram-jet engine combustion in which a detonation wave is stabilized in the engine inlet duct.

A combustible mixture will detonate under certain conditions and the resulting detonation wave will travel through a combustible mixture at a high velocity. Observations of this phenomenon in constant area channels has established that the detonation wave moves at supersonic velocity relative to the unburned mixture and the burned gases move away from the detonation wave at the local velocity of sound. The latter observation is consistent wtih theoretical predictions of Chapman and Jouguet and such detonations are called Chapman-Jouguet detonations. (Courant, R., and Friedricks, K. O., Supersonic Flow and Shock Waves, Interscience Publishers, Inc., New York, 1948, pp. 204–235.)

It was observed in the publication A Preliminary Study of the Application of Steady-State Detonative Combustion to a Reactive Engine, by Dunlap, R., Brehm, R. L., and Nicholls, J. A. (AFOSR TN 57–657, ASTIA Document No. AD 136–648, September 1957), that an application to supersonic ram-jet combustion is suggested by the fact that detonation waves are propagated at supersonic velocities relative to the unburned mixture. However, the authors proposed the establishment of the detonation wave in the divergent, nozzle portion of the engine. I conceived the idea of stabilizing the detonation wave in the convergent, inlet duct portion of the engine and I discovered that this solves serious problems, notably instability, of the previous proposal. The authors chose to position the detonation wave in the propulsion nozzle as a means of avoiding high total pressure losses across the detonation wave which were thought to occur in higher velocity areas forward of the nozzle. Total pressure losses in shock or detonation waves generally increased with increasing approach velocities. However, I have found that the detonation wave can be positioned in the forward (duct and diffuser) areas because, unobviously, as the engine goes to higher velocities the detonation wave propagation velocity and its associated total pressure loss decreases due to increasing enthalpy of the combustible mixture immediately forward of the detonation wave. An unobvious distinction, hence, was the effect of this increasing enthalpy on total pressure losses across the detonation wave.

My invention, the problems encountered, the improvements over the previous proposal, and the advantages of the system will be best understood from the following more detailed disclosure and discussion.

The objectives of my invention include: to provide a method and means for stable detonative combustion in a supersonic ram-jet engine; to solve the problem encountered in a detonative combustion system; and to provide such a method and means that achieves improved results, including the provision of a smaller, lighter engine, over other systems for powering vehicles in some flight conditions.

Reference is made in the description to the drawings, in which:

FIGURE 1 is a schematical view of a supersonic ramjet engine forming a specific embodiment of my invention;

FIGURES 2–9 are graphs illustrating various relationships involved in my invention. The graphs show approximate curves and are not intended to be read for exact values.

Figure 7:
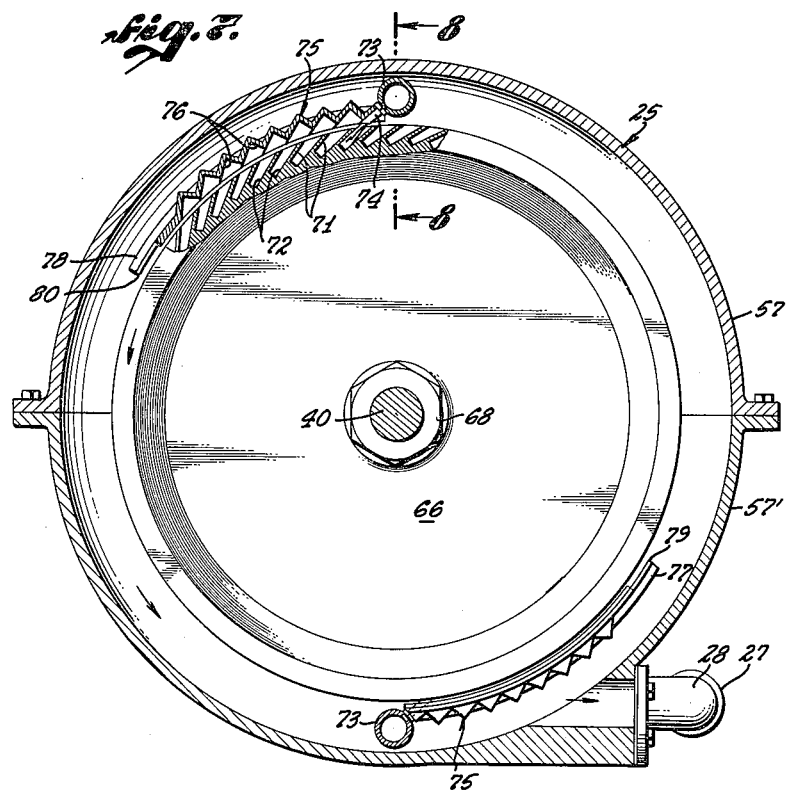

Nomenclature $a$—Local sound velocity (ft./sec.)
$C_p$—Specific heat at constant pressure
$D$—Detonation wave Mach number parameter
$f_a$—Stoichiometric fuel-air ratio
$F_n$—Net thrust (lb.)
$g$—Acceleration of gravity (ft./sec.$^2$)
$h$—Enthalpy (B.t.u./lb.)
$I_{SP}$—Specific impulse (sec.)
$J$—Mechanical equivalent of heat $\left(\frac{\text{ft.}=\text{lb.}}{\text{B.t.u.}}\right)$
$m$—Molecular weight $\left(\frac{\text{lb.}}{\text{lb.}=\text{mole.}}\right)$
$M$—Mach number
$M_x$—Propagation Mach number of a stable detonation wave relative to the unburned mixture
$P$—Pressure (lb./ft.$^2$)
$Q$—Sensible combustion heat release (assume 1510 B.t.u./lb. for stoichiometric $H_2$ and air)
$R$—Gas constant (ft.-lb./lb.-° R.)
$T$—Temperature (° R.)
$u$—Gas flow velocity (ft./sec.)
$W$—Detonation wave propagation velocity relative to unburned mixture (ft./sec.)
$W/A$—Engine air flow (lb./sec.)
$\gamma$—Ratio of specific heats
$\phi$—Equivalence ratio $(f/fs)$
$N_{je}$—Equivalent jet nozzle efficiency
$N_{KE}$—Diffuser kinetic energy efficiency

Subscripts $A$—Ambient (static) condition
$B$—Region upstream of mixing zone
$x$—Region upstream of a stable detonation wave
$y$—Region downstream of a stable detonation wave
$o$—Total or stagnation condition
$S$—Sensible energy only Observation of detonation waves has established that these waves will travel through combustible mixtures at supersonic velocities relative to the unburned mixture. Consideration of such waves has suggested their application to supersonic ram-jet combustion.

According to my invention, a diffuser and the addition of fuel are used to reduce the ram air flow velocity from its free stream value to the propagation velocity of a detonation wave positioned in the diffuser. The performance of the engine is found to be competitive with conventional variable-geometry ram-jets and to be smaller and lighter. One important feature of the system is that the detonation wave propagation velocity decreases with increasing flight Mach number.

The phenomena that occur through a detonation wave is not completely understood by those working in the art. Some researchers consider that a detonation wave is a shock induced deflagration, i.e., Courant and Friedricks supra. In any case, for a Chapman-Jouguet detonation, the variation of the state properties, pressure, temperature, enthalpy, etc., can be described in terms of a flow model consisting of a normal shock wave followed by choked combustion.

A stable detonative combustion can occur when a detonation wave is initiated in a combustible mixture having a flow velocity equal to the detonation wave propagation velocity. A ram-jet engine using this combustion technique is smaller and lighter than a conventional ram-jet because of the elimination of the subsonic diffuser, the subsonic combustion chamber and the convergent portion of the propulsion nozzle.

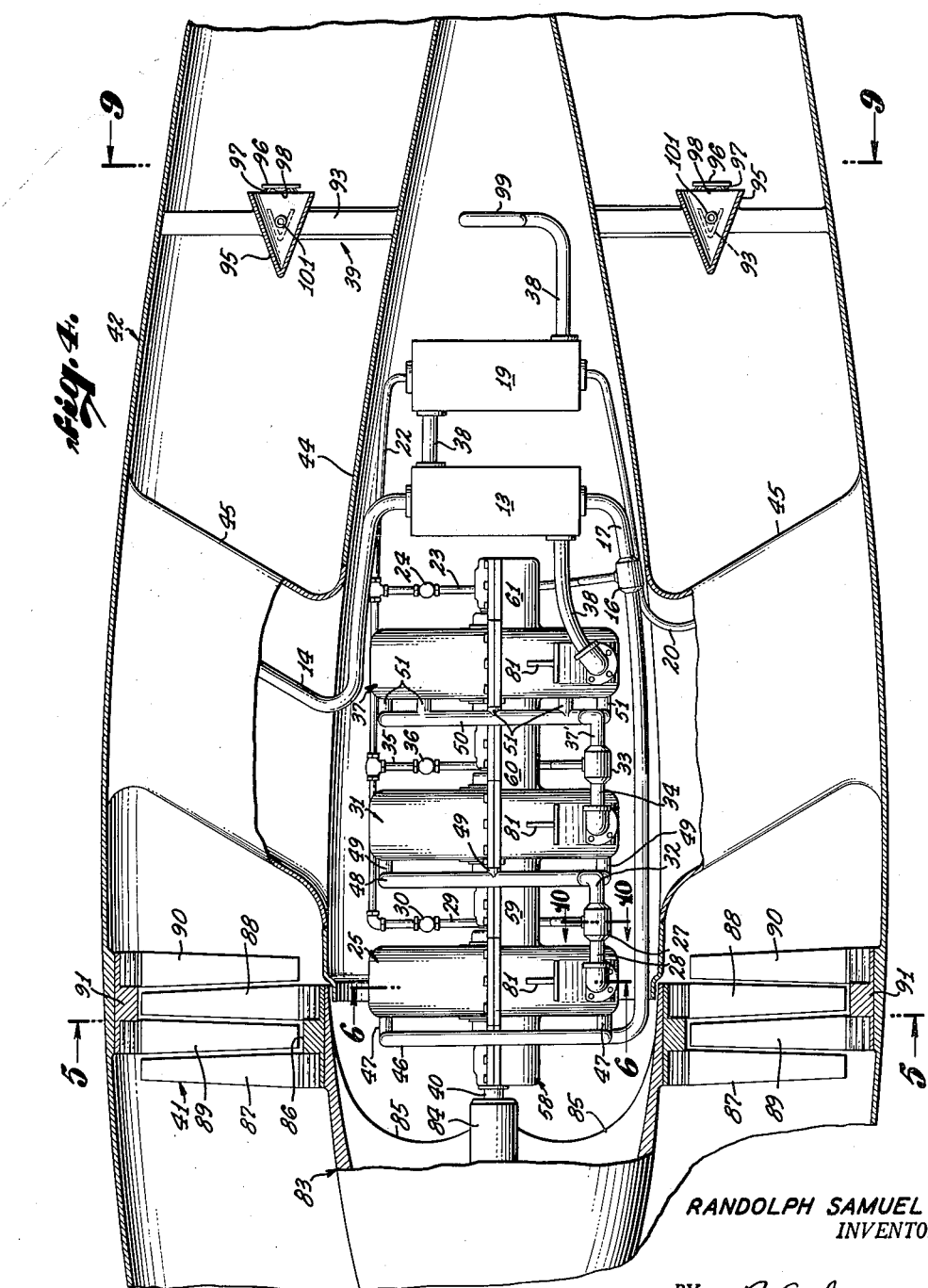

June 26, 1962  R. S. RAE  3,040,518
PROPULSION UNIT
Filed March 22, 1954  5 Sheets-Sheet 3
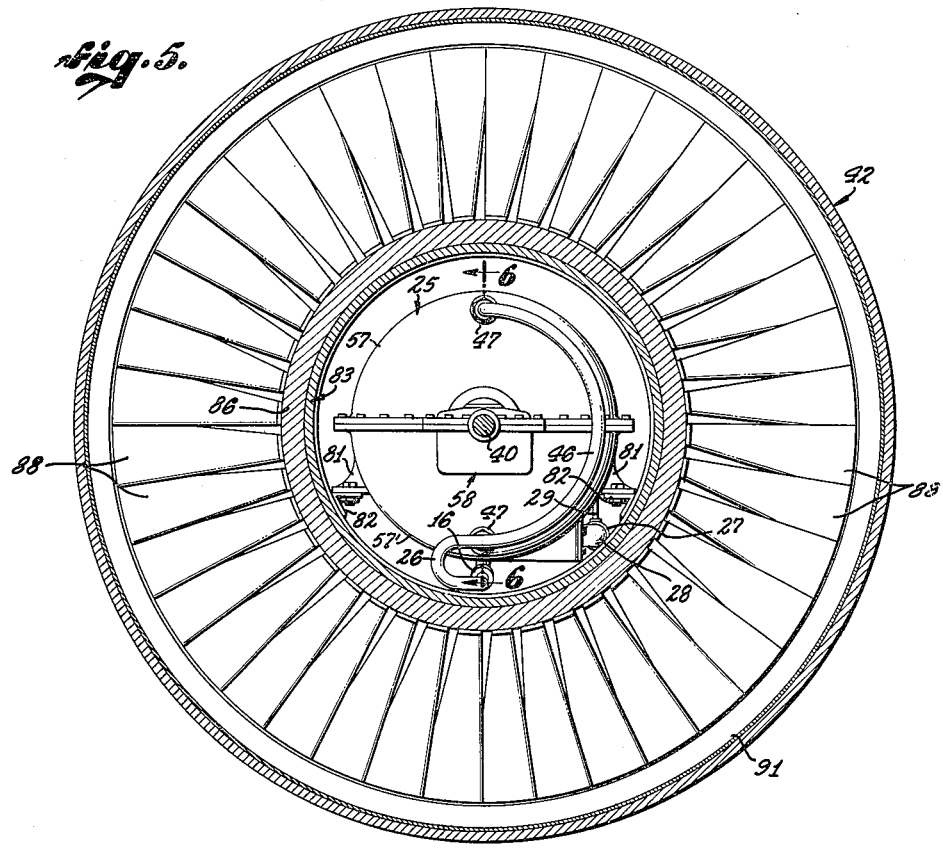
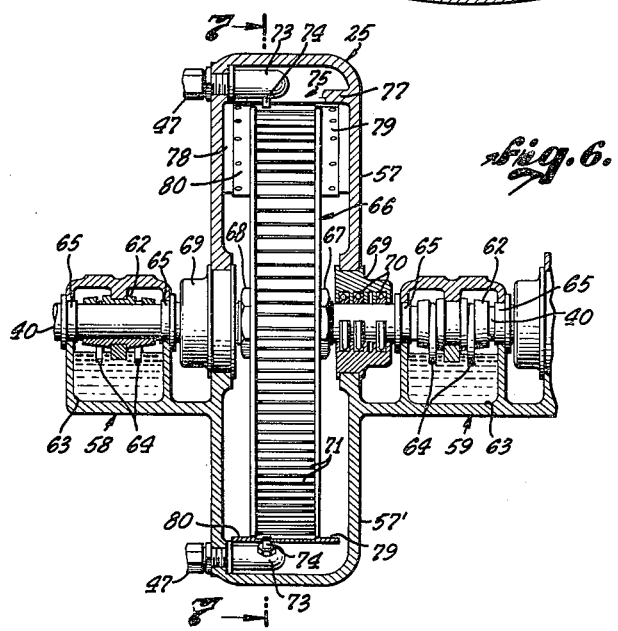
RANDOLPH SAMUEL RAE,
INVENTOR.
BY R. E. Geaugue
ATTORNEY.

June 26, 1962 R. S. RAE 3,040,518
PROPULSION UNIT
Filed March 22, 1954 5 Sheets-Sheet 4

RANDOLPH SAMUEL RAE,
INVENTOR.

BY R. E. Geauque

ATTORNEY.

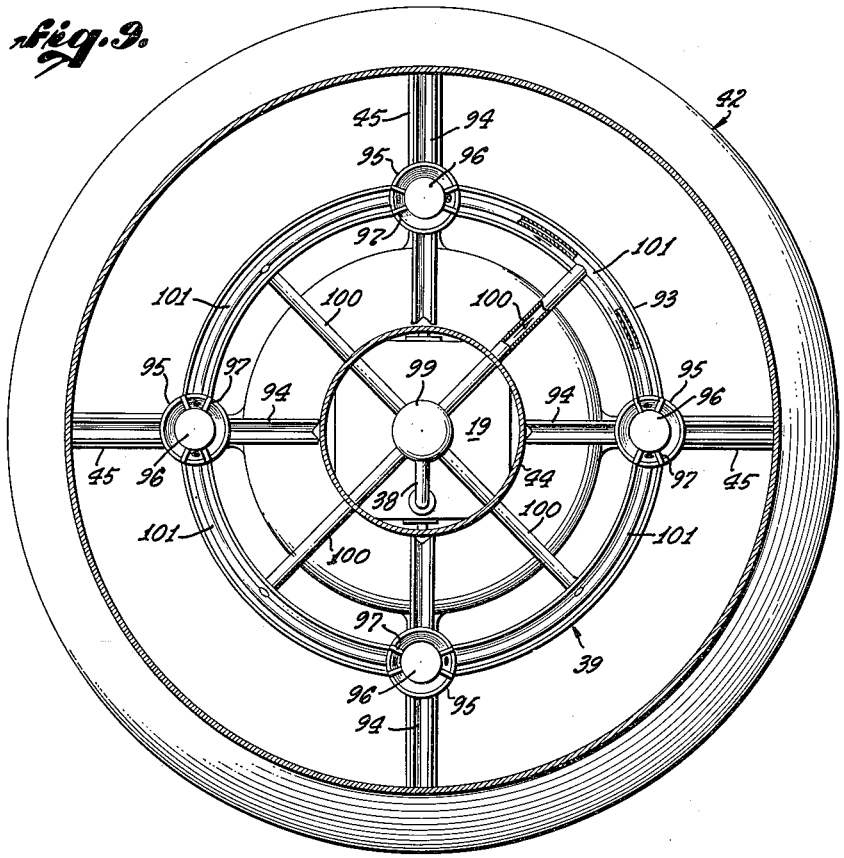
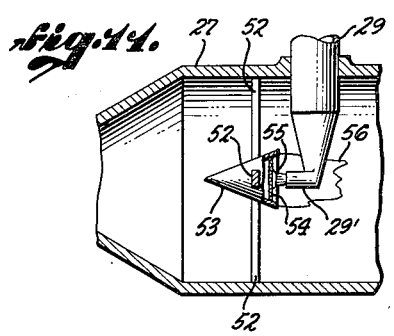
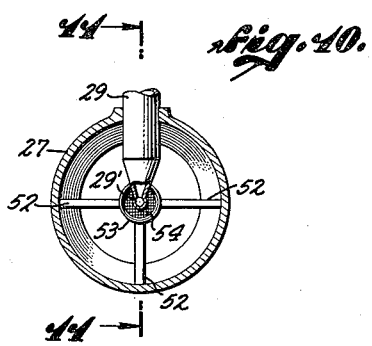
RANDOLPH SAMUEL RAE,
INVENTOR.

United States Patent Office 3,040,518
Patented June 26, 1962

3,040,518
PROPULSION UNIT
Randolph Samuel Rae, Santa Monica, Calif., assignor to The Garrett Corporation, Los Angeles, Calif., a corporation of California
Filed Mar. 22, 1954, Ser. No. 417,828
6 Claims. (Cl. 60—35.6)

This invention relates to a propulsion unit and more particularly to a propulsion unit for a craft in which the engine develops a rotational output and this output is converted to jet thrust for propelling the craft.

In copending U.S. application Serial No. 417,867, filed March 22, 1954, by Randolph Samuel Rae, there is disclosed a non-air breathing engine which functions efficiently independently of its surroundings so that the engine is particularly useful as a power developing unit for high altitude aircraft and underwater craft. This engine develops a rotative power output which can be utilized to propel an aircraft at high altitudes by rotating a large, wide pitch propeller. However, such large propellers are objectionable for aircraft at high speed due to their loss of efficiency.

By the present invention, a compact propulsion unit is provided for propelling high altitude aircraft in which the rotational output of the aircraft engine is connected to a compressor located within a duct so that the air drawn through the duct can provide a jet reaction thrust on the aircraft. The invention can utilize a non-air breathing engine which operates on liquid hydrogen as the fuel and liquid oxygen as the oxidant and the engine can be comprised of a number of stages, each of which has a combustion chamber for combusting a portion of the fuel directed to the engine. Since such an engine can be very compact, it can be located directly within the duct which contains the compressor. Also, since the exhaust from the engine will contain some uncombusted fuel as a dilutant, afterburner means can be positioned in the duct behind the compressor in order to increase the thrust developed by the engine. While the propulsion unit of this invention is particularly suitable for high altitude flight, it can be utilized generally for propelling vehicles and can utilize any well-known type of engine.

It is therefore an object of the invention to provide a propulsion unit for propelling an aircraft, which unit is particularly suitable for high altitude flight.

A further object of the invention is to provide a propulsion unit for converting rotational power output into a jet thrust for propelling the craft on which the unit is mounted.

A still further object of the invention is provision of a propulsion unit driven by a non-air breathing engine in order to propel a craft at very high altitudes.

Another object of the invention is to provide a propulsion unit comprised of a compressor located within a duct which has a nozzle-shaped exit and has an afterburner positioned forward of the exit.

These and other objects of the invention not specifically set forth above will become readily apparent from the following description and drawings in which:

FIGURE 1 is a diagrammatic view of the propulsion unit of the present invention illustrating the manner in which the compressor is driven by a non-air breathing engine.

FIGURE 2 is a front elevation view of the physical embodiment of the invention.

FIGURE 3 is a partial vertical section of the propulsion unit taken along line 3—3 of FIGURE 2, illustrating the compressor and afterburner within the duct.

FIGURE 4 is a vertical section similar to that of FIGURE 3 illustrating the manner in which the engine is mounted within the duct in order to drive the compressor.

FIGURE 5 is a transverse vertical section of the unit illustrating the compressor blades and the front of the engine.

FIGURE 6 shows a vertical section along line 6—6 of FIGURE 5 illustrating the construction of the helical flow turbines comprising one stage of the engine.

FIGURE 7 is a transverse vertical section of the helical flow turbine showing the reversing plates.

Figure 8:
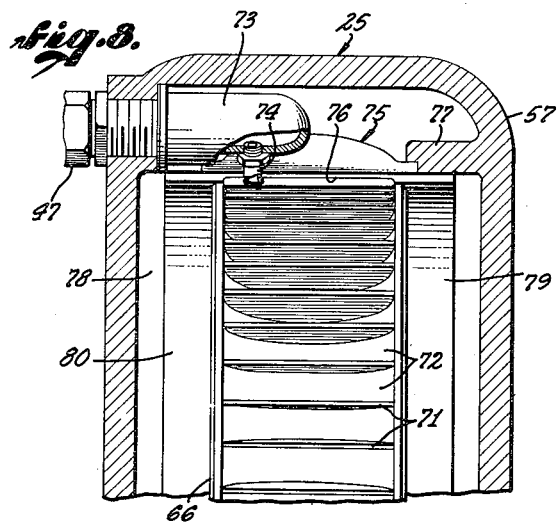

FIGURE 8 is a vertical section along line 8—8 of FIGURE 7 illustrating the manner in which the turbine nozzles are directed into the turbine buckets.

FIGURE 9 is a transverse vertical section along line 9—9 of FIGURE 4 showing the construction of the afterburner.

FIGURE 10 is a transverse vertical section along line 10—10 of FIGURE 4 showing the construction of one of the combustion chambers utilized for the aircraft engine.

FIGURE 11 is a vertical section along line 11—11 of FIGURE 10 illustrating the flame holder utilized for each of the combustion chambers.

One form of the non-air breathing engine which can be utilized in connection with the invention is illustrated in FIGURE 1 and has a storage tank 12 for the engine fuel, which fuel can be either in the form of a liquid or a gas. The fuel tank 12 is connected to a heat exchanger 13 through a passage 14 which contains a pump 15 for pumping the fuel through the heat exchanger, and the heat exchanger is connected to a first combustion chamber 16 through a passage 17 in order to supply fuel to the combustion chamber. The oxidant for the fuel is stored in a tank 18 which is connected to a heat exchanger 19 through a passage 20 containing a pump 21 for passing the oxidant through the heat exchanger to passage 22. A passage 23 connects passage 22 to combustion chamber 16 and passage 23 contains a valve 24 for controlling the amount of oxidant supplied to the combustion chamber. The portion of fuel in passage 17 which is combusted in chamber 16 determines the inlet temperature in passage 26 which connects the first stage 25 of the engine with the chamber 16. The first stage 25 exhausts to a second combustion chamber 27 through a passage 28 and this second combustion chamber is likewise connected to passage 22 through a passage 29 containing a valve 30 in order to regulate the amount of oxidant directed to combustion chamber 27. In combustion chamber 27, a further amount of fuel will be combusted and the output of the combustion chamber connects with the second stage 31 of the engine through a passage 32. The exhaust from the second stage 31 connects with the third combustion chamber 33 through passage 34 and this combustion chamber is also connected with passage 22 through a passage 35 containing a valve 36. The combustion chamber 33 connects with the third stage 37 of the engine through passage 37' and stage 37 exhausts to passage 38, which passage leads through heat exchangers 19 and 13 to the afterburner 39 of the engine, which afterburner will presently be described.

The amount of fuel combusted in each of the combustion chambers 16, 27, and 33 will depend upon the setting of valves 24, 30 and 35, respectively and sufficient fuel will be combusted in each combustion chamber to raise the inlet temperature to its corresponding stage to approximately the maximum which can be withstood by the construction materials of each stage. Any suitable type of liquid or gaseous fuel can be utilized by the engine such as liquid hydrogen, gasoline, methane, acetylene, alcohol and the like, and the fuel can be combusted with any suitable oxidant, such as oxygen, hydrogen peroxide, nitric acid, etc. in either the liquid or gaseous phase. It is understood that the engine can be comprised of any selected number of stages and that each stage can consist of any suitable power unit, such as a gas expansion engine or turbine. When liquid hydrogen is utilized as the fuel supply and liquid oxygen as the oxidant supply, the heat exchangers 13 and 19 serve to increase the temperature of the hydrogen and oxygen, respectively, in order to increase the efficiency of the cycle. Also, pumps 15 and 21 will substantially increase the pressure of the liquid hydrogen and liquid oxygen, respectively, removed from the storage tanks. The output of each of the stages is connected to a common output shaft 40 which in turn is connected to compressor 41 which will presently be described in detail. The compressor 41 and the afterburner 39 are located within the duct 42 and upon rotation of the compressor by the engine, the pressure of the air within the duct will be greatly increased and the exit of this high pressure air from the nozzle exit 43 of the duct will result in a jet reaction force upon the duct itself. Since the passage 38 contains some fuel which has not been combusted in the combustion chambers, this fuel can be combusted in the afterburner with a portion of the air flowing through the duct in order to realize added thrust from the propulsion unit. The uncombusted fuel in passage 38 results from the fact that more fuel is supplied to the engine than is combusted in the chambers 16, 27 and 33. Thus, unburned fuel serves as a diluent and working medium in each stage.

A physical form of the propulsion unit is illustrated in FIGURES 2 through 4 wherein like reference numerals represent like parts as in the previous description. The engine is contained in a body member 44 which is centrally located within the duct 42 by means of four struts 45. Fuel passage 14 passes through one of the struts 45 to the heat exchanger 13 which is connected by passage 17 to combustion chamber 16 for the first stage 25 of the engine. The combustion chamber 16 connects through passage 26 with the manifold 46 for the first stage 25 and the manifold 46 has two inlet passages 47. Passage 32 connects the combustion chamber 27 with an inlet manifold 48 having four inlet passages 49 for the second stage 31 while passage 37' connects the combustion chamber 33 to an inlet manifold 50 having eight inlet passages 51 for the third stage 37. The exhaust from stage 37 is led through heat exchangers 13 and 19 to the afterburner 39. Oxidant is supplied by passage 20 through one of the struts 45 to heat exchanger 19 and then to passage 22 which supplies the combustion chambers. The physical construction of combustion chamber 27 is illustrated in FIGURES 10 and 11 and combustion chambers 16 and 33 are of identical construction. Chamber 27 contains four struts 52 which support conical section 53 having a screen base portion 54 upon which is deposited finely divided platinum. The oxidant passage 29 terminates in a nozzle 29' which is directed against the finely divided platinum 55 and the platinum acts as a catalyst to maintain the flame 56. The operation of the physical embodiment of the engine is the same as described previously for the diagrammatic form of the invention and the valves 24, 30 and 36 serve to regulate the oxidant supply to each combustion chamber so that a portion of the fuel is burned in each chamber in order to raise the inlet temperature to each of the stages.

A helical flow turbine can be utilized for each stage of the engine and the inlet passages 47, 49 and 51 to the various stages each connect with a turbine nozzle. Because of the increased number of nozzles for each succeeding stage of the engine, it is apparent that the expanded exhaust volume from each turbine can be handled by the succeeding turbine. The construction of helical flow turbine 25 is illustrated in FIGURES 6 through 8 and helical flow turbines 31 and 37 of the second and third stages, respectively, are of similar construction except for the number of turbine nozzles. The turbines of the three stages have a divided casing comprised of sections 57 and 57' which forms bearing retainer sections 58, 59, 60 and 61 on opposite sides of each of the turbines. Each of the retainer sections supports a bearing 62 for the common shaft 40 and each section forms a lubricating well 63. Each bearing 62 has two grooves for retaining lubricating rings 64 which are partially immersed in the lubricant in well 63 and which rotate with the shaft 40 in order to continually supply lubricant to the bearing. Two sealing members 65 serve to seal each of the bearing retainer sections. The rotor 66 of the turbine is keyed to the shaft 40 and is positioned on the shaft by nuts 67 and 68 screwed to the shaft 40 on opposite sides of the rotor hub. The openings for shaft 40 in the casing contain sealing members 69 having sealing rings 70 for sealing the casing around rotor 66.

Referring to FIGURE 7, the circumference of the rotor carries a series of blades 71 which form a series of buckets 72 around the periphery of the turbine. The end of each inlet passage 47 connects with a member 73 of the turbine casing and each member 73 positioned inside the turbine casing and each member 73 carries a nozzle 74 which is directed into each of the buckets 72 at one side thereof, as they pass by the nozzle. The nozzle passes through the end section of a reversing plate 75 which forms a series of spaces 76 which are located opposite the buckets of the turbine rotor. The reversing plate 75 is supported by interior curved flanged sections 77 and 78 of the turbine casing to which are riveted or otherwise secured the curved flanges 79 and 80 of the reversing plate. Because of this construction, it is apparent that the fluid pressure between the buckets and the reversing plate serves to drive the turbine rotor and that the buckets will exhaust into the interior of the casing as each bucket passes beyond the reversing plate. In the case of stage 25, the interior of the casing exhausts through passage 28 to combustion chamber 27. Since the helical flow turbines of all the stages are connected to a common shaft 40, it is apparent that the total output of the shaft will be equal to the total output of all the stages. Each of the helical flow turbines can be supported by brackets 81 positioned on opposite sides of the turbine and secured to brackets 82 carried by the body member 44 so that the turbine is held rigidly in position within the body member.

The shaft 40 connects with a substantially conical nose section 83 which has a central member 84 for receiving the end of shaft 40 and has webs 45 for supporting this central member. Section 83 carries a circular hub member 86 to which are secured two rows of axial flow compressor blades 87 and 88, and two rows of stationary blades 89 and 90 are supported by a circular member 91 which is secured to the duct 42. The row of stationary blades 89 is positioned between blades 87 and 88 while the row of stationary blades 90 is positioned aft of the blades 88. Since the blades 87 and 88 are rotated at a high speed by the non-air breathing engine, the air entering the entrance 92 of duct 42 is compressed to a high pressure by the compressor blades and when this high pressure air expands through the nozzle end 43 of the duct, the duct receives a reaction force which serves to propel the aircraft on which the duct is mounted. The axial flow compressor, comprised of the movable blades 87 and 88 and the stationary blades 89 and 90, can be of any well-known design and additional rows of blades can be utilized if necessary. The base portion of the nose section 83 covers the forward end of the body member 44 so that the section 83 and body member 44 form a continuous, streamlined surface within the interior of the duct.

Since the gases exhausting through passage 38 from the last stage 35 of the turbine contains fuel, it is possible to ignite the remaining fuel in afterburner 39 with high pressure air in duct 42 and increase the temperature of the exhaust from the nozzle end 43. A circular, V-shaped ring 93 (FIGS. 4 and 9) is positioned between duct 42 and body member 44 and is supported by four V-shaped struts 94 which extend between the duct 42 and the body member 44. A conical member 95 is located at each intersection of the ring 93 with the struts 94 and a flame holder 96 is supported across the open end of each member 95 by four arms 97. The flame holder 96 has deposited thereon finely divided platinum 98 which serves as a catalyst to maintain the burning of the fuel within the duct 42. The passage 38 connects the last stage 37 of the engine to a header 99 which has four radial tubes 100 connecting with four tube sections 101, each positioned within the V-shaped circular member 93 and connecting between two of the conical members 95. Thus, a portion of the fuel in each of the passages 100 is supplied to two separate conical members 95 and the fuel is then ignited with the high pressure air being driven through the passage 42 in order to raise the temperature of this air and thus increase the thrust caused by the expansion of the air out of the nozzle end 43.

In operation of the present invention it will be seen that the engine comprised of the stages 24, 31 and 37 will drive the common shaft 40 which in turn will rotate the blades 87 and 88 in order to develop a high pressure within the duct 42 aft of the compressor 41. The air compressed by the axial flow compressor will be raised in temperature by the combustion of the fuel in the exhaust from the last stage 37 of the engine. Thus, a high temperature, high pressure jet will exit at the nozzle end 43 of the duct 42 and can be utilized for propelling the craft which mounts the propulsion unit.

By the present invention, a propulsion unit is provided in which the engine is housed within a duct in order to drive a compressor and compress the gases entering the duct to a high pressure. In the event that liquid hydrogen is used as the fuel and liquid oxygen is used as the oxidant, it is possible to make this engine very small and compact and still obtain an ample power output. Since hydrogen is a very excellent dilutant of high specific heat, it is desirable to have a portion of pure gaseous hydrogen exhaust from the last stage of the turbine and this fuel can be utilized in an afterburner located aft of the compressor. It is understood that other types of engines besides the non-air breathing disclosed herein can be utilized and that any well-known type of compressor can be utilized within the duct. Also, the afterburner for burning the exhaust gases can be varied in any well-known manner, such as substituting an electric ignition system for the finely divided platinum catalyst. Various other modifications of the invention will become apparent to those skilled in the art without departing from the spirit and scope of the invention as hereinafter defined by the appended claims.

What is claimed is:

1. A propulsion unit comprising a straight duct having an entrance and an exit nozzle, a compressor in said duct for compressing air entering said duct, a center body centrally supported within said duct to provide an air passage between said body and said duct, work extraction means located within said center body for driving said compressor, uncombusted fuel of high specific heat supplied to said work extraction means and expanded therein as a working fluid of high specific heat to produce power, means for combusting a portion of said fuel within said work extraction means to increase the temperature and greatly increase the heat content of the uncombusted fuel serving as the working fluid, burner means located within said duct aft of said compressor and exteriorly of said center body, and means for connecting said burner means with the exhaust from said extraction means to supply the uncombusted portion of the fuel in the exhaust to said burner means, the uncombusted fuel in said exhaust being combusted in said burner means with compressed air in said duct to raise the temperature of the compressed air passing through said exit nozzle.

2. A propulsion unit as defined in claim 1 wherein said work extraction means comprises an expansion engine having a plurality of expansion stages, said combusting means comprising means for increasing the temperature of the uncombusted fuel entering each stage.

3. A propulsion unit as defined in claim 2 having an oxidant supplied to said combusting means, and means for regulating the quantity of oxidant combusted with said fuel in said combusting means to control the entering temperature to a maximum temperature that can be withstood by each stage.

4. A propulsion unit comprising a duct having an exit nozzle, a compressor for compressing air entering said duct, work extraction means for driving said compressor and comprising a plurality of expansion stages, a supply of hydrogen of high specific heat for said work extraction means, a combustion chamber located at the inlet to each stage for combusting a portion of said hydrogen prior to entering each stage to increase the temperature of the uncombusted portion to a maximum temperature which can be withstood by each stage, each stage being driven by the uncombusted portion of said hydrogen to utilize the high heat content of the uncombusted portion at the increased temperature, burner means located within said duct, and means for connecting said burner means with the exhaust from said work extraction means to supply the uncombusted portion of the hydrogen in the exhaust to said burner means, the uncombusted hydrogen in said exhaust being combusted in said burner means with compressed air in said duct to raise the temperature of the compressed air passing through said exit nozzle.

5. A propulsion unit comprising a straight duct having an entrance and an exit nozzle, a center body centrally supported within said duct and defining an air passage between said body and said duct, an expansion engine located within said center body, an axial compressor located in said duct and connected with said expansion engine for compressing air entering said duct and discharging high pressure air through said exit nozzle to produce propulsion thrust, means for supplying uncombusted hydrogen to said expansion engine as a working fluid of high specific heat, means for combusting a portion only of said hydrogen supplied to said expansion engine to increase the temperature of the uncombusted hydrogen serving as the working fluid, burner means located within said duct aft of said compressor and exteriorly of said center body, and means for connecting said burner means with the hydrogen rich exhaust from said expansion engine in order to burn the remaining hydrogen in the exhaust and heat the compressed air within said duct.

6. A method of producing power comprising the steps of introducing substantially pure hydrogen to an expansion engine, introducing into the hydrogen passing through the engine an oxidant in an amount sufficient to support combustion of a portion only of said hydrogen, combusting such portion only of the hydrogen to provide a heated working fluid rich in hydrogen and of high specific heat, expanding said working fluid through the engine to produce power, employing the power produced to provide propulsion thrust by compressing air, passing the working fluid exhausted from the engine in heat exchange relationship with the hydrogen introduced to the engine to increase the temperature of the introduced hydrogen prior to combustion and expansion thereof, introducing into the compressed air the working fluid from heat exchange with the hydrogen, and combusting the unburned hydrogen in the working fluid to heat the compressed air providing the propulsion thrust.

References Cited in the file of this patent

UNITED STATES PATENTS

| | | |
|---|---|---|
| 2,433,943 | Zwickey et al. | Jan. 6, 1948 |
| 2,443,841 | Sweeney et al. | June 22, 1948 |
| 2,455,845 | Wells | Dec. 7, 1948 |
| 2,511,385 | Udale | June 13, 1950 |

(Other references on following page)

UNITED STATES PATENTS

| | | |
|---|---|---|
| 2,602,289 | Anxionnaz et al. | July 8, 1952 |
| 2,611,239 | Briggs | Sept. 23, 1952 |
| 2,619,795 | Drake | Dec. 2, 1952 |
| 2,620,625 | Phaneuf | Dec. 9, 1952 |
| 2,641,902 | Keer | June 16, 1953 |
| 2,703,477 | Anxionnaz | Mar. 8, 1955 |
| 2,711,629 | Schapker | June 28, 1955 |

FOREIGN PATENTS

| | | |
|---|---|---|
| 386,320 | France | Apr. 9, 1908 |
| 11,955 | Great Britain | June 19, 1895 |
| 685,944 | Great Britain | Jan. 14, 1953 |

OTHER REFERENCES

Bulletin of American Interplanetary Society #16, February 1932, page 9.